UNITED STATES PATENT OFFICE.

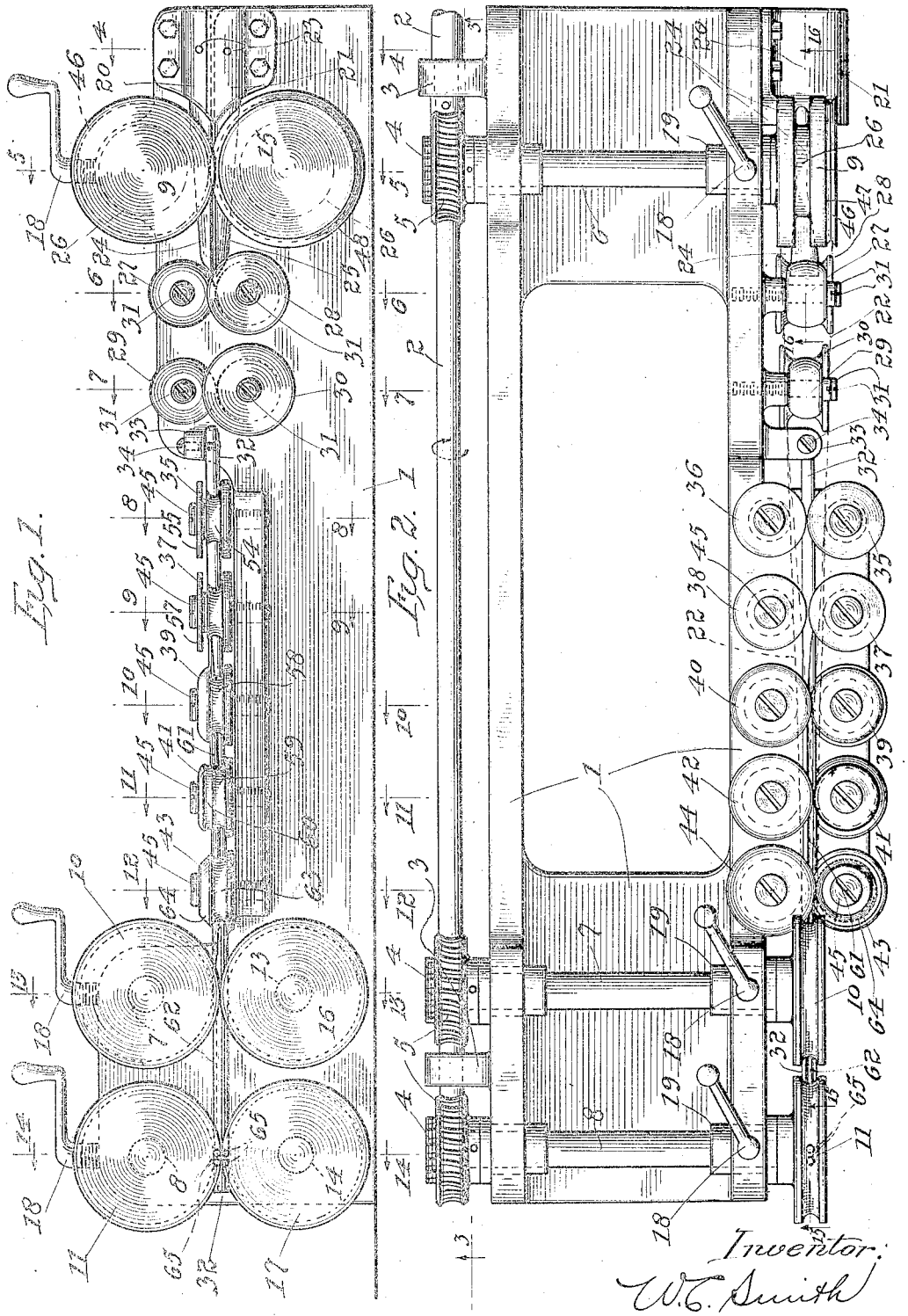

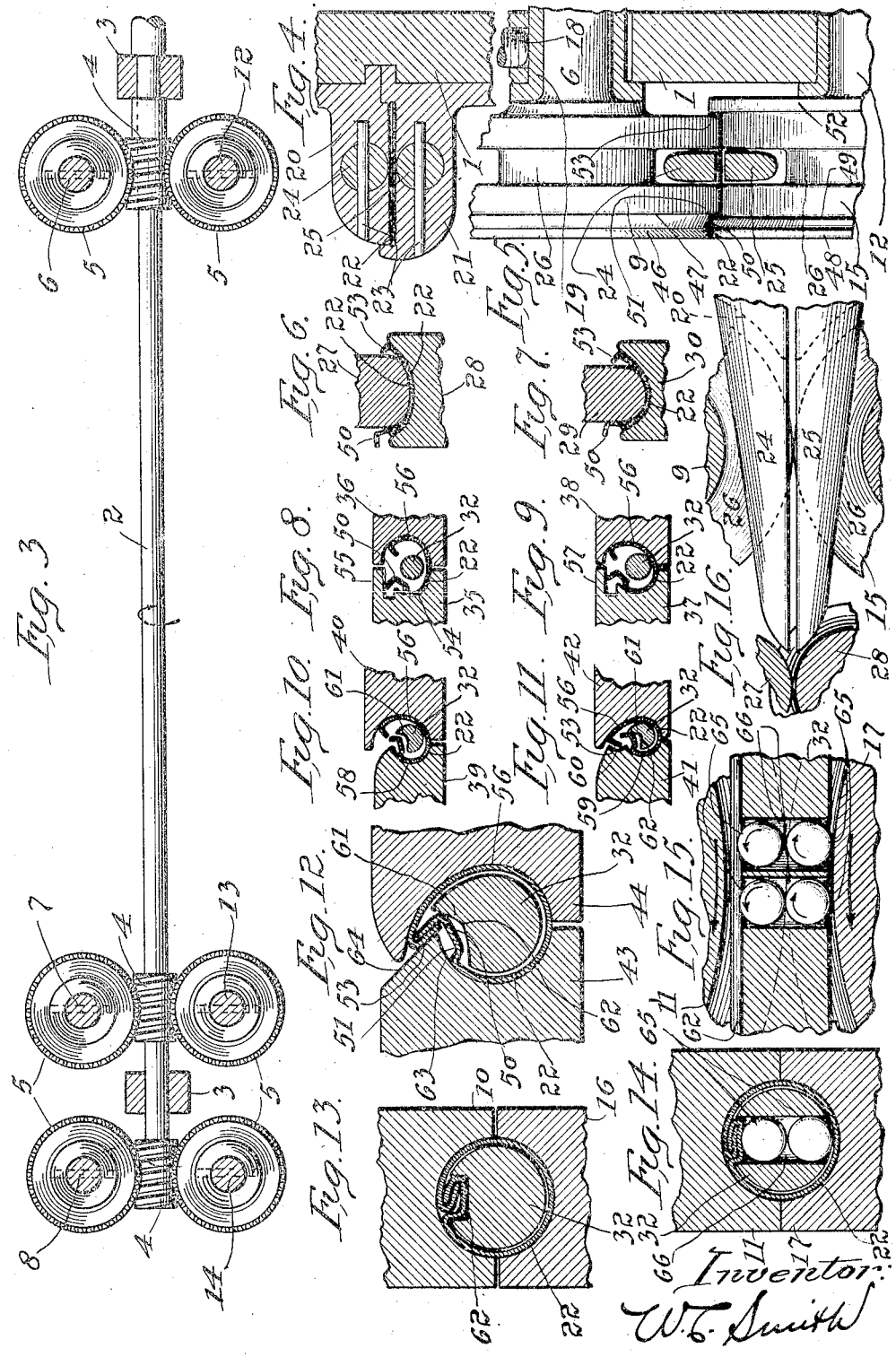

WILLIAM C. SMITH, OF CHICAGO, ILLINOIS.

SEAMED-TUBE MACHINE.

1,355,282.  Specification of Letters Patent.  Patented Oct. 12, 1920.

Application filed October 20, 1919. Serial No. 332,060.

*To all whom it may concern:*

Be it known that I, WILLIAM C. SMITH, a citizen of the United States, residing at Chicago, in the county of Cook and State of Illinois, have invented new and useful Improvements in Seamed-Tube Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in seamed tube machines of the type in which a thin metal strip is fed at a high rate of speed through dies and over a grooved mandrel for making small tubes, and more particularly long one-quarter inch tubes, which when cut into the proper lengths are extensively employed for automobile radiators.

Heretofore, in machines for making large tubes having an outside seam, an efficient pull feed for automatically ejecting the tube has been provided by mounting a pair of journaled rollers in a cylindrical mandrel so as to coöperate with pull feed rolls. But such a construction is practically impossible in machines for making one-quarter inch radiator tubing having an inside seam, since the grooved mandrel employed therein is too small in cross-sectional area to receive and adequately support a substantial pair of rollers and journals. I have found, however, that the desired self-ejection may be performed as successfully in these as in the larger machines if small steel balls are employed and so mounted in the mandrel as to permit of occasional renewal. These balls have true rolling friction and are capable not only of maintaining a high speed but also of rotation in any direction, which tends to an even distribution of wear.

The main object of my invention is to provide a machine for making inside seam tubing with a pair of anti-friction balls so mounted in a grooved mandrel as to coöperate with a pair of pull feed rolls for feeding an inside seam tube over said mandrel at a high rate of speed, whereby excessive friction, wear and overheating of the mandrel is overcome.

A further object is to provide a tube machine with a pair of balls so mounted in a removable mandrel as to be retained by a pair of pull feed rolls and released by removal of the mandrel or a longitudinal movement thereof.

A further object is to provide a tube machine with a pair of balls mounted for free vertical movement in a horizontal mandrel and adapted to be supported by one of a pair of pull feed rolls arranged above and below said mandrel, the passage of a tube over said mandrel automatically lifting the balls slightly and effecting a coöperation thereof with said rolls for feeding the tube.

A further object is to provide a machine for making inside seam tubing with a pair of balls mounted in a grooved mandrel so as to project into the groove thereof and to coöperate with a pair of concave pull feed rolls for compressing and transversely curving a tube seam traversing said groove, whereby said seam is securely locked.

A further object is to provide a machine for making inside seam radiator tubing with a pair of balls mounted for free rolling movement over each other in a grooved mandrel and of such a size as to project into the mandrel groove when a tube is passing thereover, and a pair of concave pull feed rolls conforming to the tube and adapted to exert pressure thereon, said balls resisting the pressure of said rolls and effecting a rolling of the tube seam traversing said groove, whereby the tube is rendered very stiff and water-tight.

A further object is to provide a machine for making inside seam copper tubing with a pair of coöperating steel balls mounted in a grooved mandrel so that their centers lie in a plane perpendicular thereto, the size of the balls being such as to project into the mandrel groove when a tube is passing thereover, and a pair of concave pull feed pressure rolls for pressing the tube seam into said groove whereupon a coöperation of the balls therewith is produced, a line contact on the inside of the tube being made by one ball and a transversely curved path on the tube seam by the other, and the rolling action of the hard balls on the relatively soft copper tube permitting high speed without injury to the balls.

A further object is to provide a machine for making inside seam tubing with a pair of balls mounted in a hole drilled transversely through a grooved mandrel from the groove thereof, and a pair of pull feed rolls adapted to coöperate with said balls for compressing a tube seam in said groove, the balls conforming substantially to the circumference of the retaining hole and being free to change their axes of rotation when consecutive tubes are run, whereby the life of the balls is prolonged.

A further object is to provide a mandrel tube machine with a pair of seam flanging feed rolls for forming a three-part flange on one edge of a strip and a right angle flange on the other, and a series of elements through which the flanged strip is fed for forming the strip and interlocking the flanges thereof, the interlocked seam flanges being received in a channel mandrel groove, to the bottom and a side wall of which the intermediate and inner portions of said three-part flange conform respectively prior to compression of the seam, whereby the excessive mandrel resistance tending to buckle the strip and created by displacement of a seam having a two-part or V-flange is overcome.

A further object is to provide a tube machine with a pair of seam flanging feed rolls for forming a three-part flange on one edge of a strip and a right angle flange on the other, and a series of tube forming elements through which the flanged strip is fed by said rolls, the angle formed between the intermediate and inner portions of said three-part flange stiffening the strip and decreasing the buckling tendency thereof.

A further object is to provide a tube machine with a pair of seam flanging feed rolls having opposite peripheral grooves through which slightly separated fingers are extended for positively guiding and confining a strip fed by said rolls until stiffened by means provided for imparting a transverse curvature thereto, the bight of said rolls lying in a plane between said fingers.

And a further object is to provide a tube machine with roller tube forming and interlocking elements of such construction as to reduce the resistance on the strip being fed to a minimum. Other objects will appear hereinafter.

With these objects in view, my invention consists in the novel construction, combination and arrangement of parts, all as will be described hereinafter and more particularly pointed out in the appended claims.

An embodiment of the invention is shown in the accompanying drawings forming a part of this specification, and in which Figure 1 is a side elevation showing the machine with the front end at the right of the figure and the rear end at the left. Fig. 2 is a top plan view of the machine. Fig. 3 is a longitudinal section taken on line 3—3 of Fig. 2 showing worm gearing employed in the machine. Fig. 4 is an enlarged transverse section taken on line 4—4 of Fig. 1 showing the construction of strip guiding means. Fig. 5 is an enlarged transverse section taken on line 5—5 of Fig. 1 showing the construction and mounting of seam flanging feed rolls. Figs. 6 to 12, inclusive, are enlarged transverse sections taken on corresponding lines of Fig. 1 showing roller tube forming elements. Figs. 13 and 14 are enlarged transverse sections taken on corresponding lines of Fig. 1 showing seam closing pull feed rolls. Fig. 15 is an enlarged longitudinal section taken on line 15—15 of Fig. 2 through one pair of said seam closing rolls. And Fig. 16 is an enlarged longitudinal section taken on line 16—16 of Fig. 2 showing an anti-buckling strip guiding means.

A form of construction as shown in the drawings comprises a frame 1 and a drive shaft 2 journaled in bearings 3 projecting from said frame, as shown in Fig. 2. Shaft 2 carries worms 4 for driving worm wheels 5, which are pinned to shafts 6, 7 and 8 formed integral with feed roll 9 and seam closing rolls 10 and 11, respectively, and also to shafts 12, 13 and 14 formed integral with feed roll 15 and seam closing rolls 16 and 17, respectively.

Hand-operated set-screws 18, which contact with bearings 19 of shafts 6, 7 and 8, are provided to regulate the pressure of the seam flanging and seam closing rolls.

Blocks 20 and 21, arranged one above the other and secured to frame 1, are adapted to receive strip 22 and furnish initial guiding means therefor, said blocks being clearly shown in Figs. 1, 2 and 4. Secured in blocks 20 and 21 by means of pins 23 are strip guide fingers 24 and 25, which extend rearwardly through opposite circumferential grooves 26 of feed rolls 9 and 15 toward a pair of primary tube forming idler rollers 27 and 28, which have convex and concave peripheries, respectively, the rear ends of said fingers being preferably flared, as shown in Fig. 2, in order to provide a maximum guiding surface for resisting the buckling tendency of the strip.

Fingers 24 and 25 furnish adequate guiding means until the strip being fed reaches rollers 27 and 28, whereupon a transverse curvature is imparted thereto which so stiffens the same as to render further stationary guiding means unnecessary, said curvature being clearly shown in Fig. 6. That the strip is bent transversely, and consequently stiffened, by the flanges of roller 28 before the ends of guide fingers 24 and 25 are reached, will be clear by reference to Figs. 1, 2 and 16. The pressure between rollers 27 and 28 is negligible, since the function thereof is to form the strip only.

From rollers 27 and 28 strip 22 is fed, by means of rolls 9 and 15, between rollers 29 and 30 which increase the strip curvature, as shown in Fig. 7, all of said rollers being rotatably mounted on horizontal threaded studs 31 which are screwed into frame 1.

After passing the transversely curved rollers 29 and 30, the strip is wrapped or formed around a removable grooved mandrel 32, which is secured to a lug 33 projecting from frame 1 by means of a screw 34, the forming being accomplished by means of a series of idler roller tube forming elements 35 to 44, inclusive, which are rotatably mounted on vertical threaded studs 45 screwed into frame 1.

Feed roll 9 is provided with a V-groove 46 and a radial wall 47 coöperating, respectively, with a V-ridge 48 and a radial wall 49 provided on feed roll 15 for forming a three-part seam flange 50 on one edge of strip 22. Since the inner portion is very narrow, this flange is substantially V-shaped, but the bend 51 formed at the juncture of the intermediate and inner portions and retained in the strip until the seam is formed, as shown in Figs. 13 and 14, is a very important feature in this high speed machine for making inside seam tubing.

While bend 51 apparently has not been recognized, heretofore, as a part of the formation of radiator tubes, such a bend is actually formed in the ordinary two-part or V-flange by displacement of the seam in a grooved mandrel. Such displacement or crushing of the seam into a mandrel groove by means of seam closing rolls produces excessive wear on the mandrel and resistance to the strip being fed, the wear being so rapid that depressions or notches are soon formed which necessitates frequent mandrel renewals. A distinct advantage is gained, therefore, by utilizing the feed rolls for making this bend at the outset. The high resistance tending to buckle the strip is thereby eliminated, and the strip is reinforced by the bend formed therein. In the one case a high resistance is brought to bear on a relatively weak strip, and in the other a low resistance on a strong strip. Furthermore, thinner, softer and less expensive copper strips may be run when a high resistance does not exist, the strip commonly employed being at least ten-thousandths of an inch in thickness and rolled hard and stiff to prevent buckling in the tube forming operation. Feed roll 15 is also provided with a radial flange 52 for forming a seam flange 53 on the strip.

Roller 35, of the tube forming elements, comprises a small transversely curved groove 54, for forming substantially one-half of the strip, and an overhanging flange 55 for limiting upward movement of flange 50, this edge of the strip tending to move upward more than the other edge. Rollers 36, 38, 40, 42 and 44 have large transversely curved grooves 56 for forming the other half of the strip.

Roller 37 is similar to roller 35, and a flange 57 thereon is provided for the same purpose as flange 55.

Rollers 39 and 41 have small curved grooves 58 and 59, respectively, and the latter is provided with a very small curved groove 60, above groove 59, for bending flange 53 slightly, in order to facilitate the interlocking operation shown in Fig. 12. It will be seen that pressure on flange 53 tends to rotate the tube without effecting the desired result, hence the provision of a wall or abutment 61 in the mandrel groove 62 against which flange 50 bears for preventing such rotation.

The interlocking operation is performed by means of rollers 44 and 43, the latter having a small curved groove 63 merging into a beveled edge 64 for pressing flange 53 against the outer portion of flange 50, which is properly positioned by wall 61. This manner of interlocking between roll peripheries, which squeeze a portion of the flanges together before the seam is completed in mandrel groove 62, forms an essential feature of the invention, since the mandrel is relieved of work which heretofore has been imposed thereon.

Rolls 10 and 16 partially form the seam in mandrel groove 62, as shown in Fig. 13. The seam is then completed by the coöperation of rolls 11 and 17, mandrel 32, and antifriction balls 65 operating in cylindrical transverse holes 66 formed in said mandrel, as shown in Figs. 14 and 15. These balls are exceedingly efficient in reducing friction, and, while they are but one-tenth of an inch in diameter in a machine for making one-quarter inch radiator tubes, the resistance incident to seam forming is greatly reduced and the pull feed of rolls 11 and 17 rendered very efficient for ejecting the tube.

It will be seen, by reference to Figs. 1 and 16, that balls 65 are retained by rolls 11 and 17 prior to running a tube, and that they are released by moving the removable mandrel longitudinally or by removal thereof. Renewal of the balls is effected very quickly, since they are so small as to be readily picked up on the tip of the finger, when smeared with vaseline, and inserted in the retaining holes 66, in which they will stick until the mandrel is secured in position. While balls 65 normally rest on roll 17, they are instantly lifted to operative position by the passage of a tube; the rolling of a transverse curvature into the seam, whereby the tube is stiffened and the seam securely locked, being clearly shown in Fig. 14. Since holes 66 are cylindrical and conform substantially to the circumference of the small steel balls 65, the strength of the mandrel is not seriously impaired.

The operation of the machine is as follows: Assuming that the seam flanging rolls and seam closing pull feed ejecting rolls are being driven at the same speed, then upon inserting one end of a strip coil between guide blocks 20 and 21, said end will be engaged by rolls 9 and 15 and be fed thereby through the forming rollers, the shape thereof being such as to automatically thread the strip as well as to bend the same into tubular form. After the tube has passed through the seam closing rolls a pull feed will be exerted thereon and the tube will run through the machine with but little tendency to buckle, since the balls, angle 51, fingers 24 and 25, and the roller forming and interlocking elements all coöperate in overcoming the buckling tendency, which is the chief source of trouble in this type of machine.

While I have shown anti-friction balls only between one pair of seam closing rolls, one or more pairs of balls may be provided for each pair of the plurality of pairs of seam closing rolls, and the number of pairs of rolls may be increased in order to decrease the feeding pressure of each pair.

From the foregoing description of feed rolls 9 and 15, it might appear that the grooves 26 formed therein would impair the efficiency thereof, but in practice this is not found to be the case. The feeding surfaces, being cylindrical, are theoretically correct, and with a reasonable pressure slippage and consequent abrasion never occurs.

While I have illustrated and described the preferred form and size of construction for carrying my invention into effect, there might be variations and modifications without departing from the spirit of the invention.

I, therefore, do not wish to be limited to the precise details of construction set forth, but desire to avail myself of such variations and modifications as come within the scope of the appended claims.

Having thus described my invention, what I claim is:

1. A machine for making inside seam tubing comprising in combination, a removably secured grooved mandrel and a pair of pull feed pressure rolls conforming substantially thereto, there being a hole between said rolls drilled transversely through the mandrel from the groove thereof, and a pair of balls removably inserted in said hole for coöperation with said rolls in feeding a seamed tube over said mandrel, one of said balls projecting into said groove for transversely curving the tube seam traversing said groove, and said balls being free to roll on each other and to change their axes of rotation.

2. A machine for making inside seam tubing comprising in combination, a pair of concave coöperating pull feed rolls and a grooved mandrel interposed therebetween, and a frictionless abutment for said rolls comprising a pair of coöperating balls mounted in said mandrel, the mandrel groove being longitudinal and there being a retaining hole for the balls extending through the mandrel substantially at right angles to the bottom of the groove, the combined diameters of the two balls being slightly greater than the distance from the bottom of said groove to the opposite side of the mandrel.

3. A machine for making inside seam tubing comprising in combination, a pair of seam flanging feed rolls for forming a three-part seam flange on one edge of a strip and a right angle flange on the other, a series of tube forming and flange interlocking elements through which the flanged strip is fed by said rolls, a mandrel having a channel groove for the reception of the interlocked seam flanges, the intermediate portion of said three-part flange conforming substantially to the bottom of said groove and the inner portion thereof to a groove wall prior to compression of the seam, and operatively arranged seam compressing rolls.

4. A seamed tube machine comprising in combination, a pair of seam flanging feed rolls having opposite peripheral grooves formed therein, a pair of stationary slightly separated fingers extending through said grooves for guiding and confining a strip fed by said rolls, the bight of said rolls lying in a plane between said fingers, means arranged adjacent said fingers for transversely curving the strip by the time the same reaches the finger ends, and a series of tube forming elements arranged beyond said fingers through which the strip is fed by said rolls.

5. A seamed tube machine comprising in combination, a pair of seam flanging feed rolls having opposite peripheral grooves formed therein, a pair of rigid slightly separated fingers extending through said grooves for guiding a strip fed by said rolls, the bight of the latter lying in a plane between said fingers, a pair of coöperating transversely curved rolls arranged beyond said fingers for curving the strip by the time the same reaches the finger ends, and a series of tube forming elements arranged beyond said curved rolls through which the strip is fed by said first named rolls.

6. A seamed tube machine comprising a pair of seam flanging cylindrical feed rolls having peripheral grooves therein, a series of pairs of tube forming idler rollers arranged beyond said feed rolls, strip guides extending through said grooves to one pair of said rollers, and a mandrel having a grooved wall therein for coöperation with a pair of said rollers for interlocking the strip flanges, one of said last named rollers having a groove and beveled edge for pressing the flanges against said wall.

7. A seamed tube machine comprising a grooved mandrel; feeding means for forming a substantially V-shaped flange on one edge of a strip and a right angle flange on the other; means for wrapping the strip thus formed around said mandrel so that the vertex of said V-shaped flange abuts a wall of the mandrel groove, and said right angle flange projects over said V-shaped flange; a grooved idler roller for forcing said right angle flange into said V-shaped flange; and a coöperating grooved idler roller having a conical surface for bending said right angle flange and squeezing the same against the free edge portion of said V-shaped flange; said wall resisting such action.

8. A tube machine comprising a grooved mandrel, a pair of feed rolls conforming to a lock-seam tube traversing said mandrel, the mandrel groove forming a guide for the interlocked seam flanges, and a frictionless abutment for said rolls operatively mounted in said mandrel and presenting a convex prominence in the middle of the groove bottom for pressing the middle portions of the seam flanges outward.

In witness whereof, I have set my hand this 16th day of October, 1919.

WILLIAM C. SMITH.

Witnesses:
W. H. CONRAD,
H. SLACK.